United States Patent
Atia et al.

(10) Patent No.: US 10,116,743 B2
(45) Date of Patent: Oct. 30, 2018

(54) STORAGE CAPACITY FORECASTING BY CAPABILITY SETS

(71) Applicant: INTERNATIONAL BUSINESS MACHINES CORPORATION, Armonk, NY (US)

(72) Inventors: Ohad Atia, Haifa (IL); Amalia Avraham, Petach Tikva (IL); Shay Berman, Modlin (IL); Ran Harel, Kfar-Saba (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 312 days.

(21) Appl. No.: 14/988,933

(22) Filed: Jan. 6, 2016

(65) Prior Publication Data
US 2017/0195419 A1    Jul. 6, 2017

(51) Int. Cl.
| | |
|---|---|
| *G06F 12/00* | (2006.01) |
| *H04L 29/08* | (2006.01) |
| *H04L 12/24* | (2006.01) |
| *G06F 3/06* | (2006.01) |

(52) U.S. Cl.
CPC .......... *H04L 67/1097* (2013.01); *G06F 3/065* (2013.01); *H04L 41/20* (2013.01); *G06F 3/0619* (2013.01)

(58) Field of Classification Search
CPC ...... G06F 3/065; G06F 3/0619; G06F 3/0683; G06F 12/0868; G06F 2212/1032; G06F 2212/261; G06F 2212/283; G06F 2212/313
See application file for complete search history.

(56) References Cited

U.S. PATENT DOCUMENTS

| | | | |
|---|---|---|---|
| 6,718,347 | B1 | 4/2004 | Wilson |
| 7,162,575 | B2 | 1/2007 | Dalal et al. |
| 7,693,877 | B1 | 4/2010 | Zasman |
| 2009/0019251 | A1 | 1/2009 | Helman et al. |
| 2010/0257326 | A1 | 10/2010 | Otani et al. |
| 2013/0311986 | A1 | 11/2013 | Arrouye et al. |
| 2014/0078344 | A1 | 3/2014 | Yoon et al. |

(Continued)

OTHER PUBLICATIONS

U.S. Appl. No. 14/988,933, filed Jan. 6, 2016.

(Continued)

*Primary Examiner* — Matthew Bradley
(74) *Attorney, Agent, or Firm* — Griffiths & Seaton PLLC

(57) ABSTRACT

Methods, computing systems and computer program products implement embodiments of the present invention that include defining multiple capabilities for a set of resources, the resources comprising storage space. A plurality of services are defined, each of the services including one or more of the capabilities for a subset of the resources, and a software defined storage (SDS) system is configured including the defined services. Upon the SDS system receiving a request to forecast an amount of the storage space including one or more of the capabilities that will be available at a specified future time, one or more of the services including the one or more capabilities are identified, and a predicted amount of the storage space for the identified one or more services is computed for specified future time. In some embodiments, a given identified given service includes one or more additional capabilities not required by the request.

20 Claims, 3 Drawing Sheets

(56) References Cited

U.S. PATENT DOCUMENTS

2014/0129719 A1     5/2014   Weber et al.
2015/0058467 A1     2/2015   Douglas et al.

OTHER PUBLICATIONS

U.S. Appl. No. 14/988,950, filed Jan. 6, 2016.
U.S. Appl. No. 14/988,965, filed Jan. 6, 2016.
Wright et al., "A Constraints-Based Resource Discovery Model for Multi-Provider Cloud Environments," Journal of Cloud Computing: Advances, Systems and Applications, Jun. 21, 2012 (23 pages).
Bermes et al., "Digital Preservation at the National Library of France: A Technical and Organizational Overview," World Library and Information Congress: 74th IFLA General Conference and Council, 2008 (10 pages).
List of IBM Patents or Patent Applications Treated as Related dated Mar. 30, 2016 (2 pages).
U.S. Appl. No. 14/988,950, filed Jan. 6, 2016 (35 pages).
U.S. Appl. No. 14/988,965, filed Jan. 6, 2016 (30 pages).

STORAGE CAPACITY FORECASTING BY CAPABILITY SETS

FIELD OF THE INVENTION

The present invention relates generally to storage capacity forecasting, and specifically to a processing storage capacity forecast request in a software-defined storage system.

BACKGROUND

In a software-defined storage (SDS) system, storage hardware is separated from software that manages the storage infrastructure. In SDS, the software managing a software-defined storage environment may also provide policy management for features such as deduplication, replication, thin provisioning, snapshots and backup. By definition, SDS software is separate from the hardware it is managing, and can be implemented via appliances over a traditional Storage Area Network (SAN), or implemented as part of a scale-out Network-Attached Storage (NAS) solution, or as the basis of an Object-based storage solution.

The description above is presented as a general overview of related art in this field and should not be construed as an admission that any of the information it contains constitutes prior art against the present patent application.

SUMMARY

There is provided, in accordance with an embodiment of the present invention a method, including defining multiple storage capabilities for a set of storage resources, the storage resources including storage space, defining a plurality of storage services, each of the storage services including one or more of the storage capabilities for a subset of the storage resources, configuring a software defined storage (SDS) system including the defined storage services, receiving, by the SDS system, a request to forecast an amount of the storage space including one or more of the storage capabilities that will be available at a specified future time, identifying one or more of the storage services including the one or more storage capabilities, and computing, for the identified one or more storage services, a predicted amount of the storage space at the specified future time.

There is also provided, in accordance with an embodiment of the present invention an apparatus, including multiple storage devices, and a processor configured to define multiple storage capabilities for a set of storage resources, the storage resources including storage space on the storage devices, to define a plurality of storage services, each of the storage services including one or more of the storage capabilities for a subset of the storage resources, to configure a software defined storage (SDS) system including the defined storage services, to receive, by the SDS system, a request to forecast an amount of the storage space including one or more of the storage capabilities that will be available at a specified future time, to identify one or more of the storage services including the one or more storage capabilities, and to compute, for the identified one or more storage services, a predicted amount of the storage space at the specified future time.

There is further provided, in accordance with an embodiment of the present invention a computer program product, the computer program product including a non-transitory computer readable storage medium having computer readable program code embodied therewith, the computer readable program code including computer readable program code configured to define multiple storage capabilities for a set of storage resources, the storage resources including storage space, computer readable program code configured to define a plurality of storage services, each of the storage services including one or more of the storage capabilities for a subset of the storage resources, computer readable program code configured to arrange a software defined storage (SDS) system including the defined storage services, computer readable program code configured to receive, by the SDS system, a request to forecast an amount of the storage space including one or more of the storage capabilities that will be available at a specified future time, computer readable program code configured to identify one or more of the storage services including the one or more storage capabilities, and computer readable program code configured to compute, for the identified one or more storage services, a predicted amount of the storage space at the specified future time.

BRIEF DESCRIPTION OF THE DRAWINGS

The disclosure is herein described, by way of example only, with reference to the accompanying drawings, wherein.

DETAILED DESCRIPTION OF EMBODIMENTS

As usage of software defined storage (SDS) increases, storage administrators find themselves dealing with many types of storage systems, each holding a unique set of capabilities. For example, a storage administrator may needs to provision storage space with specific capabilities that are defined either by a software application or by users that will use the provisioned storage space. Therefore, efficiently monitoring and planning storage space allocation are crucial skills for storage administration.

Embodiments of the present invention enable systems implementing storage abstraction (e.g., a software defined storage system) to process requests to forecast storage capacity. As described hereinbelow, multiple storage capabilities for a set of storage resources are defined, the storage resources comprising storage space, and a plurality of storage services are defined, each of the storage services comprising one or more of the storage capabilities for a subset of the storage resources. A software defined storage (SDS) system comprising the defined storage services is configured, and upon the SDS system receiving a request to predict an amount of the storage space comprising one or more of the storage capabilities that will be available at a specified future time, one or more of the storage services comprising the one or more storage capabilities are identified, and a predicted amount of the storage space is computed for the identified one or more storage services.

Figure 1:
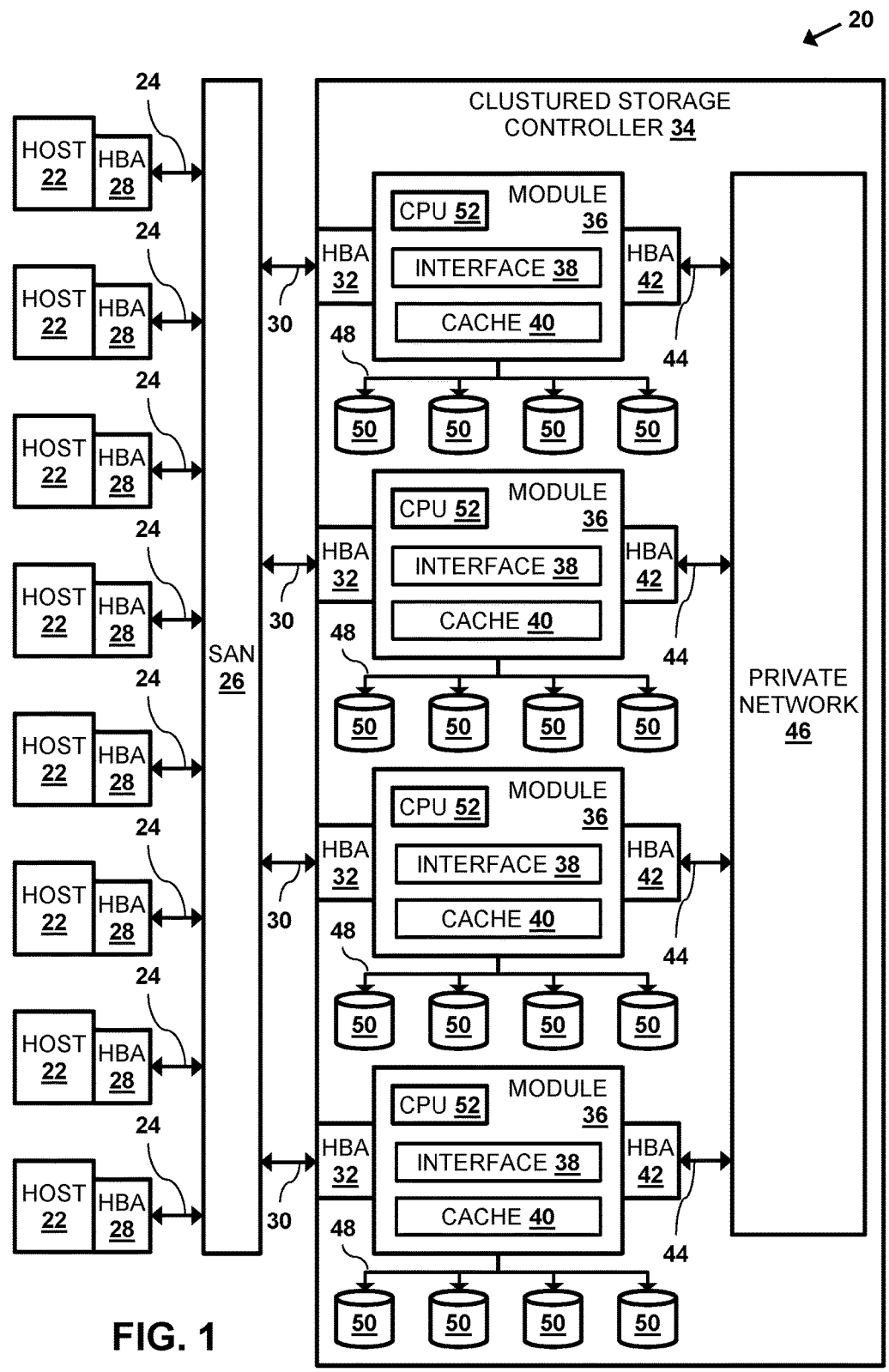
FIG. 1 is a block diagram that schematically illustrates a storage system comprising a storage controller, in accordance with an embodiment of the present invention.

FIG. 1 is a block diagram that schematically illustrates a data processing storage subsystem 20, in accordance with an embodiment of the invention. The particular subsystem (also referred to herein as a storage system) shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host bus adapters (HBAs). Clustered storage controller 34 implements clusters of storage modules 36, each of which includes a processor 52, an interface 40 (in communication between adapters 32 and 42), and a cache 38. Each storage module 36 is responsible for a number of storage devices 50 by way of a data connection 48 as shown.

As described previously, each storage module 36 further comprises a given cache 38. However, it will be appreciated that the number of caches 38 used in storage subsystem 20 and in conjunction with clustered storage controller 34 may be any convenient number. While all caches 38 in storage subsystem 20 may operate in substantially the same manner and comprise substantially similar elements, this is not a requirement. Each of the caches 38 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 38 coupled to respective sets of storage devices 50. In some configurations, the sets of storage devices 50 comprise one or more hard disks, or solid state drives (SSDs) which can have different performance characteristics. In response to an I/O command, a given cache 38, by way of example, may read or write data at addressable physical locations of a given storage device 50. In the embodiment shown in FIG. 1, caches 38 are able to exercise certain control functions over storage devices 50. These control functions may alternatively be realized by hardware devices such as disk controllers (not shown), which are linked to caches 38.

Each storage module 36 is operative to monitor its state, including the states of associated caches 38, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 38 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

While the configuration in FIG. 1 shows storage controller 34 comprising four modules 36 and each of the modules coupled to four storage devices 50, a given storage controller comprising any multiple of modules 36 coupled to any plurality of storage devices 50 is considered to be with the spirit and scope of the present invention.

Figure 2:
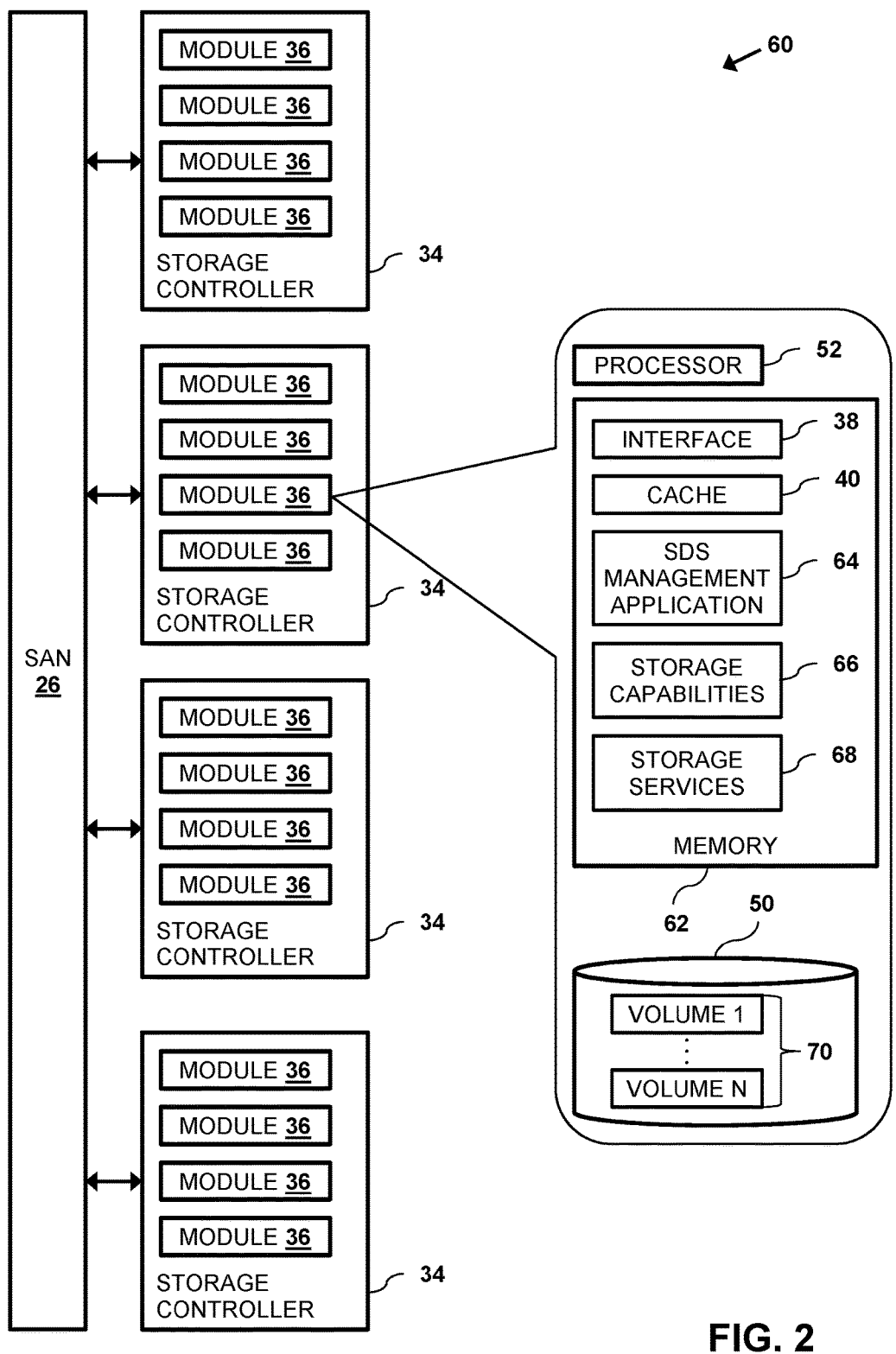
FIG. 2 is a block diagram that schematically illustrates configuration of multiple storage controllers configured as a software-defined storage (SDS) system, in accordance with an embodiment of the present invention.

FIG. 2 is a block diagram that schematically illustrates a SDS system 60 comprising multiple storage controllers 34, in accordance with an embodiment of the present invention. While FIG. 2 shows SDS system 60 comprising multiple clustered storage controllers 34, configuring the SDS system using any type of storage systems is considered to be within the spirit and scope of the present invention.

Each module 36 stores cache 38 and interface 40 in a memory 62. In one or more of modules 36, memory 62 stores an SDS management application 64, a set of storage capabilities 66 and a set of storage services 68. Processor 52 executes SDS management application 64 that uses storage resources in storage controllers 34 to configure and manage SDS system 60. In embodiments where SDS management application 64 executes in more than one module 36, the SDS management application can be configured as a distributed software application to manage SDS system 60.

In some embodiments, SDS system 60 managed by SDS management application 64 comprises storage resources in one or more modules 36 in one or more storage controllers 34 including a given module 36 comprising the SDS management application. In alternative embodiments, SDS system 60 comprises one or more modules 36 in one or more storage controllers 34 wherein none of the modules having the storage resources used by SDS system 60 include the SDS management application that manages the SDS system.

In embodiments of the present invention, the storage resources comprise physical and logical resources in storage controllers 34 such as storage space, processor resources such as processor utilization and networking resources such as network throughput. For example, storage devices 50 may comprise a mix of solid state disk drives (SSDs), higher capacity "slower" hard disk drives and lower capacity "faster disk drives, and the storage space may be allocated as blocks of storage space (e.g., 100 MB) on each type of the storage devise.

Storage capabilities 66 comprise various methods that storage services that SDS system 60 can offer for storing data such as encryption, compression and thin provisioned storage pools. In some embodiments, different types/levels of compression and different types/levels of encryption may be stored as separate storage capabilities 66.

Storage services 68 comprise blocks of storage resources configured with one or more storage capabilities. For example, a first given storage service 58 may comprise 128 MB of compressed storage space on an SSD, and a second given storage service 58 may comprise 500 GB of encrypted storage space on a hard drive that is configured as a thin pool.

In some embodiments, the storage resource may comprise logical volumes 70. In the configuration shown in FIG. 2, storage devices 50 comprise storage space that processor 52 can partition into logical volumes 70. Each logical volume can be stored on a single storage device 50 or can be distributed among multiple storage devices 50 in one or more storage controllers 34. Therefore a given storage service 68 may be distributed over multiple storage devices 50 and/or multiple storage controllers 34.

One or more storage controllers 34 may be coupled to a data terminal 72 comprising a keyboard 74 and a display 76.

Processors 52 comprise general-purpose central processing units (CPU) or special-purpose embedded processors, which are programmed in software or firmware to carry out the functions described herein. The software may be downloaded to modules 36 in electronic form, over a network, for example, or it may be provided on non-transitory tangible media, such as optical, magnetic or electronic memory media. Alternatively, some or all of the functions of processors 52 may be carried out by dedicated or programmable digital hardware components, or using a combination of hardware and software elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Storage Capacity Forecasting

Figure 3:
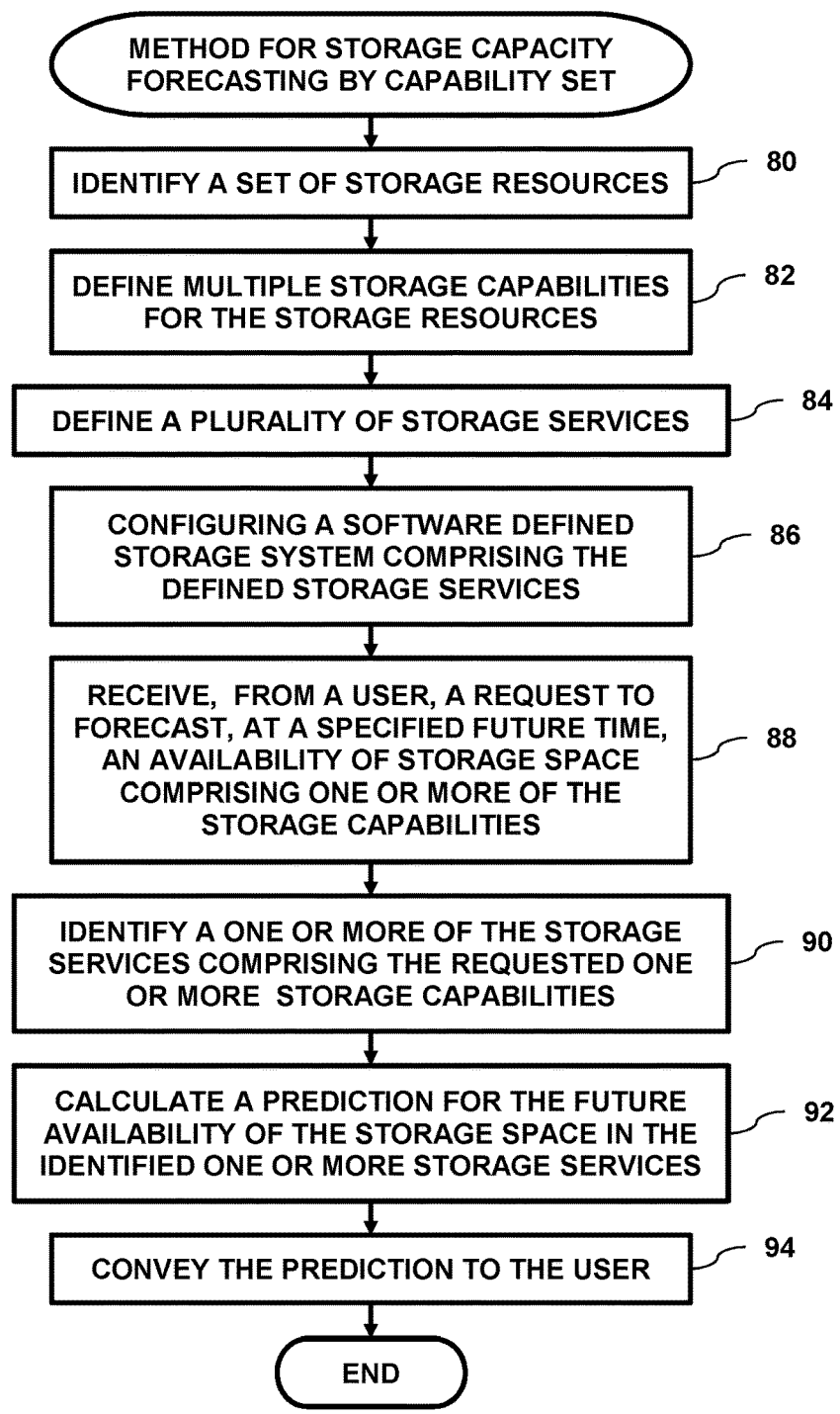
FIG. 3 is a flow diagram that schematically illustrates a method of forecasting, in the SDS system, available storage having one or more specific storage capabilities, in accordance with an embodiment of the preset invention.

FIG. 3 is a flow diagram that schematically illustrates a method of forecasting storage capacity (i.e., storage space) by a set of one or more storage capabilities 66 in SDS system 60, in accordance with an embodiment of the present invention. In a first identification step 80, SDS management application 64 identifies a set of storage resources in storage controllers 34, and in a first definition step 82, the SDS management application defines multiple storage capabilities 66 for the identified storage resources.

In a second definition step 84, SDS management application 64 defines a plurality of software services 68 that comprise the identified storage resources and the defined storage capabilities 66, and in a configuration step 86, the SDS management application configures SDS system 60 comprising the defined software services. The storage resources, the storage capabilities and the storage services are described supra in the description referencing FIG. 2.

In a receive step 88, SDS management application 64 receives, from a user, a request to forecast, at a specified time in the future, an availability of storage space in SDS system 60 comprising one or more storage capabilities 66. For example, a system administrator may want a forecast for the amount of thinly provisioned compressed storage space that will be available in six months.

In a second identification step 90, SDS management application 64 identifies one or more storage services 68 that comprise the requested storage capabilities. In some embodiments, a given identified storage services 68 may comprise one or more additional storage capabilities 66 not included in the request. For example, the request may be to forecast compressed storage space, and the given storage service 68 may comprise storage space that is compressed and encrypted.

In a computation step 92, SDS management application 64 computes, for the identified one or more storage service, a prediction for the amount of the storage space that will be available at the specified time. As described hereinbelow, SDS management application 64 may use a historical availability analysis to compute the prediction. In some embodiments, the historical analysis may comprise trend, seasonality and cycle analyses.

Finally, in a convey step 94, SDS management application 64 conveys the computed prediction to the user, and the method ends. In the embodiments described in the flow diagram, the request comprise a request for a forecast (i.e., at a specified future time) of an availability storage resources associated with a given storage service 68. In a second embodiment, as described hereinbelow, the request (i.e., in step 88) may comprise alert request, and SDS management application 64 can be configured to convey an alert upon detecting that the available storage space in the one or more identified services falls below an amount specified in the request.

For example, a storage administrator may need to know that storage capacity for a given storage capability 66 or if a set of the storage capabilities is expected hit a defined minimum limit in the near future, even when additional storage space in SDS system 60 may still be available. Since several storage systems (e.g., storage controllers 34) may share some qualities and differ in others, the storage administrator needs to be able and define a set of storage capabilities 66 for which the storage systems that fulfill these capabilities will be monitored as a unit, with a capacity forecaster that enables alerts to be raised as needed. As there may be several sets of storage capabilities 66, systems implementing embodiments of the present invention can provide a simple and automatic way to define monitoring and forecast for storage systems fulfilling a dynamic set of required storage capabilities 66.

Given an existing forecasting method that may be applied to full storage systems, SDS management application 64 can use a filtering mechanism based on storage capabilities 66 in order to forecast aggregated storage usage based on the storage systems that satisfy the given set of requirements. This can also apply to a more basic mechanism which alerts the storage administrator when the storage space goes below a certain threshold, aggregating all storage space holding a given set of storage capabilities 66.

For example, SDS management application 64 can take a forecasting method F(S) that, given a storage system S or an aggregated system comprised of several storage systems, and its historical data, can forecast future storage usage. F'(S, C) can be defined so that given a set of storage systems S and a set of required storage system capabilities C, F'(S, C) can forecast storage usage of the storage space that fulfills capabilities C, using the following algorithm:

```
F' (S,C) :
    S' = empty storage system set.
    For each storage system s in S:
        If (for each capability c in C, s fulfills c):
            S' = S' + s
    result = F(S')
```

In embodiments of the present invention, the result of forecasting method F' may be used in the same manner that F is used.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
defining multiple storage capabilities for a set of storage resources, the storage resources comprising storage space;
defining a plurality of storage services, each of the storage services comprising one or more of the storage capabilities for a subset of the storage resources;
configuring a software defined storage (SDS) system comprising the defined storage services;
receiving, by the SDS system, a request to forecast an amount of the storage space comprising one or more of the storage capabilities that will be available at a specified future time; wherein receiving the request comprises receiving an input from a user indicating the specified future time and the one or more of the storage capabilities that will be available at the specified future time;
identifying one or more of the storage services comprising the one or more storage capabilities; and
computing, for the identified one or more storage services, a predicted amount of the storage space at the specified future time.

2. The method according to claim 1, wherein each of the storage capabilities is selected from a group consisting of a compression capability, an encryption capability and a thin provisioning capability.

3. The method according to claim 1, wherein the storage resources comprise additional resources selected from a group consisting of processing resources and networking resources.

4. The method according to claim 1, wherein computing the prediction comprises computing a historical availability analysis for the storage space in the one or more identified services.

5. The method according to claim 1, wherein the request comprises an alert request, and comprising conveying an alert upon detecting that the available storage space in the one or more identified services falls below an amount specified in the request.

6. The method according to claim 1, wherein the storage space for a given storage resource is distributed among multiple physical storage devices.

7. The method according to claim 1, wherein a given identified given storage service comprises one or more additional storage capabilities not required by the request.

8. An apparatus, comprising:
multiple storage devices; and
a processor configured:
to define multiple storage capabilities for a set of storage resources, the storage resources comprising storage space on the storage devices,
to define a plurality of storage services, each of the storage services comprising one or more of the storage capabilities for a subset of the storage resources,
to configure a software defined storage (SDS) system comprising the defined storage services,
to receive, by the SDS system, a request to forecast an amount of the storage space comprising one or more of the storage capabilities that will be available at a specified future time; wherein receiving the request comprises receiving an input from a user indicating the specified future time and the one or more of the storage capabilities that will be available at the specified future time,
to identify one or more of the storage services comprising the one or more storage capabilities, and
to compute, for the identified one or more storage services, a predicted amount of the storage space at the specified future time.

9. The apparatus according to claim 8, wherein each of the storage capabilities is selected from a group consisting of a compression capability, an encryption capability and a thin provisioning capability.

10. The apparatus according to claim 8, wherein the storage resources comprise additional resources selected from a group consisting of processing resources and networking resources.

11. The apparatus according to claim 8, wherein the processor is configured to compute the prediction by computing a historical availability analysis for the storage space in the one or more identified services.

12. The apparatus according to claim 8 wherein the request comprises an alert request, and wherein the processor is configured to convey an alert upon detecting that the available storage space in the one or more identified services falls below an amount specified in the request.

13. The apparatus according to claim 8, wherein the storage space for a given storage resource is distributed among multiple physical storage devices.

14. The apparatus according to claim 8, wherein a given identified given storage service comprises one or more additional storage capabilities not required by the request.

15. A computer program product, the computer program product comprising:
a non-transitory computer readable storage medium having computer readable program code embodied therewith, the computer readable program code comprising:
computer readable program code configured to define multiple storage capabilities for a set of storage resources, the storage resources comprising storage space;

computer readable program code configured to define a plurality of storage services, each of the storage services comprising one or more of the storage capabilities for a subset of the storage resources;

computer readable program code configured to arrange a software defined storage (SDS) system comprising the defined storage services;

computer readable program code configured to receive, by the SDS system, a request to forecast an amount of the storage space comprising one or more of the storage capabilities that will be available at a specified future time; wherein receiving the request comprises receiving an input from a user indicating the specified future time and the one or more of the storage capabilities that will be available at the specified future time;

computer readable program code configured to identify one or more of the storage services comprising the one or more storage capabilities; and computer readable program code configured to compute, for the identified one or more storage services, a predicted amount of the storage space at the specified future time.

16. The computer program product according to claim 15, wherein each of the storage capabilities is selected from a group consisting of a compression capability, an encryption capability and a thin provisioning capability, and wherein the storage resources comprise additional resources selected from a group consisting of processing resources and networking resources.

17. The computer program product according to claim 15, wherein the computer readable program code is configured to compute the prediction by computing a historical availability analysis for the storage space in the one or more identified services.

18. The computer program product according to claim 15, wherein the request comprises an alert request, and comprising computer readable program code configured to convey an alert upon detecting that the available storage space in the one or more identified services falls below an amount specified in the request.

19. The computer program product according to claim 15, wherein the storage space for a given storage resource is distributed among multiple physical storage devices.

20. The computer program product according to claim 15, wherein a given identified given storage service comprises one or more additional storage capabilities not required by the request.

* * * * *